May 4, 1948.　　　　F. E. HANSEN　　　　2,440,946
VALVED JOINT
Filed Dec. 15, 1945　　　　2 Sheets-Sheet 1

INVENTOR.
FRED E. HANSEN
BY
Kwis Hudson Boughton & Williams
ATTORNEYS

May 4, 1948. F. E. HANSEN 2,440,946
VALVED JOINT
Filed Dec. 15, 1945 2 Sheets-Sheet 2

INVENTOR.
FRED E. HANSEN
BY
Kwis Hudson Boughton & Williams
ATTORNEYS

Patented May 4, 1948

2,440,946

UNITED STATES PATENT OFFICE 2,440,946

VALVED JOINT

Fred E. Hansen, Lakewood, Ohio

Application December 15, 1945, Serial No. 635,216

5 Claims. (Cl. 137—69)

This invention relates to improvements in valved joints, that is joints for hydraulic or other fluid conductors so constructed that the meeting ends of the conductors may be closed before the joint is disconnected, thereby avoiding any leakage of liquid, and one in which the connection may be reinstated without introducing any air into the system.

One of the objects of the invention is the provision of a simple joint of this character having a minimum number of parts which may be manufactured at relatively low cost, and one having minimum servicing requirements.

Another object is the provision in such a joint of generally spherical valve elements mounted to turn in correspondingly shaped packings of simple design and efficient action.

Still another object is the provision of a joint of the character stated in which the two valve elements have surfaces of revolution, one of the elements having a cavity conforming to the surface of the other element and the latter element having a passage therethrough of a diameter such that it may accommodate the surface of the first named element, whereby the two elements may be revolved one at a time in spite of the fact that they are spaced apart a distance less than the diameter of one element.

Other objects and features of novelty will appear as I proceed with the description of that embodiment of the invention which, for the purposes of the present application, I have illustrated in the accompanying drawings, in which Fig. 1 is a plan view of a joint embodying the invention.

Figure 1:
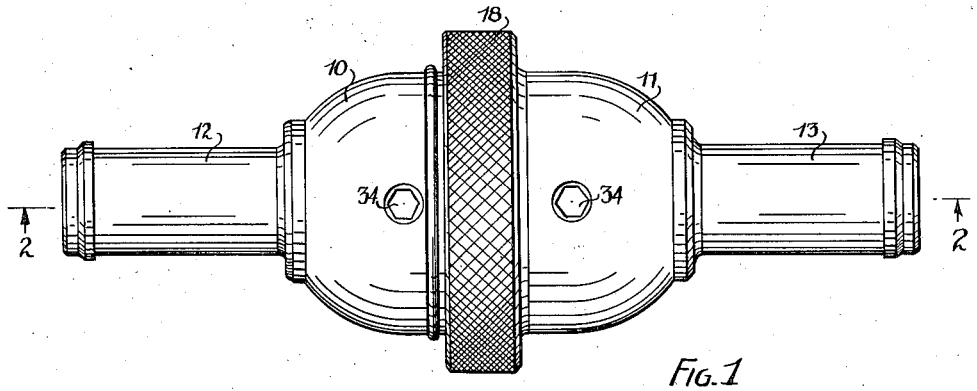
Figure 2:
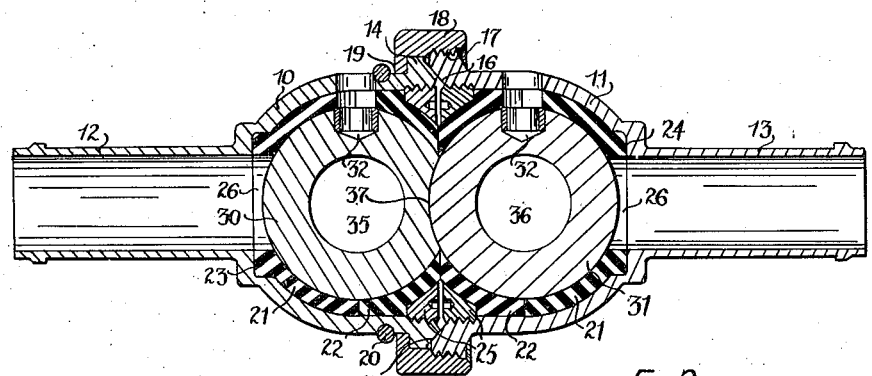
Fig. 2 is a longitudinal sectional view taken substantially on the line 2—2 of Fig. 1, with the valves in position for closing the meeting ends of the conductor preparatory to disconnecting the joint.
Figure 3:
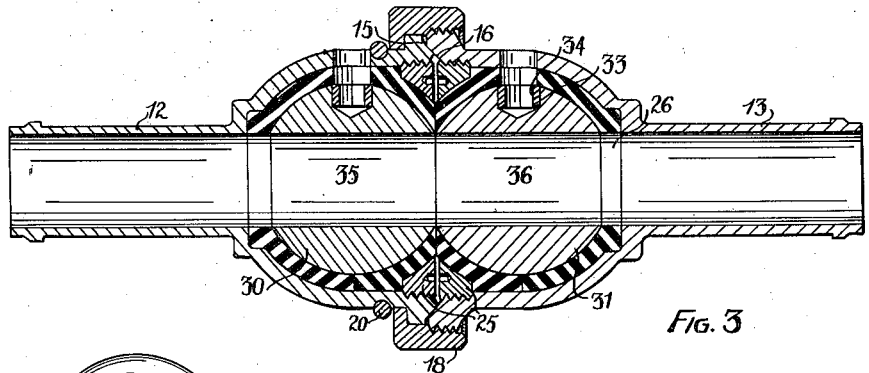
Fig. 3 is a similar view showing the valve elements aligned to permit flow of fluid through the joint.
Figure 4:
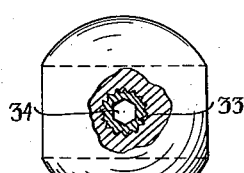
Fig. 4 is a plan view partly in section of one of the valve elements.
Figure 5:
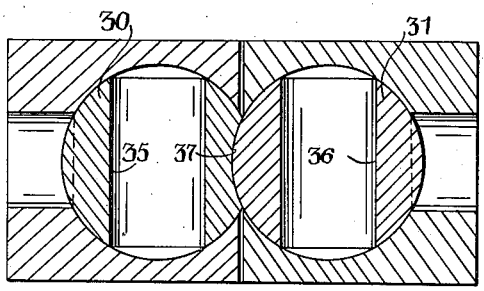
Figure 8:
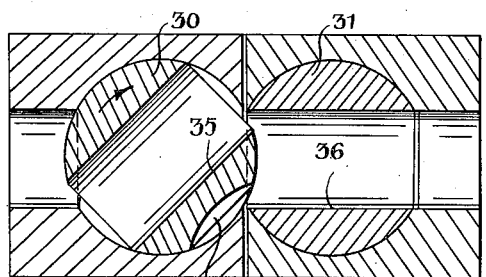
Figure 6:
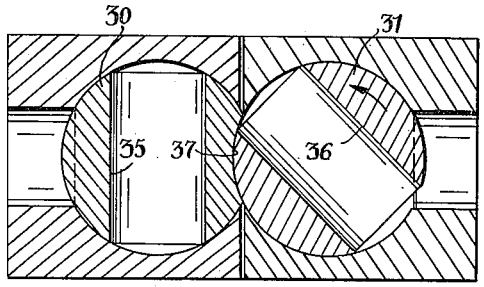
Figure 9:
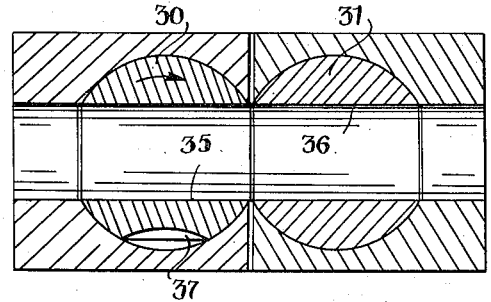
Figure 7:
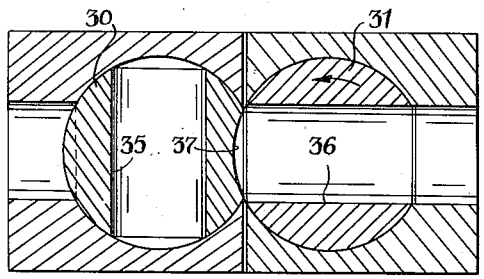

Figs. 5 to 9 inclusive are diagrammatic views illustrating the steps of operation for moving the valve elements from the closed position of Fig. 2 to the open position of Fig. 3.

In the drawings 10 and 11 are two housings with hollow shanks 12 and 13 adapted to be inserted into flexible fluid conductors, not shown, and to be secured thereto by a conventional means. In the illustrated case the housings 10 and 11 are circular in cross-section and are adapted to be mated with each other to bring the shanks 12 and 13 into axial alignment. Preferably, and as shown, housing 10 carries a flange 14 which has a beveled male surface 15, while the housing 11 has a female beveled surface 16 which engages the surface 15 for guiding the two housings into axial alignment. The terminal part of the housing 11 is provided with threads 17. A collar clamp 18 having a flange 19 for engagement with flange 14 is internally threaded, and when turned in one direction coacts with threads 17 to clamp the two housings together. When turned in the opposite direction it disconnects the two housings. A split ring 20 set into a shallow groove in the housing 10 serves as a stop to prevent the collar 18 from being dislodged when it is unscrewed to separate the two housings.

In each of the housings there is mounted a two-part resilient packing, the parts of which are marked 21 and 22. The two parts 21, which are identical in the disclosed structure, seat against shoulders 23 and 24 in the housings 10 and 11. The parts 22, which are also identical, are held in position and in engagement with the parts 21 by means of rings 25 that are threaded into the housings 10 and 11. These rings have surfaces formed to engage packing parts 22, but to leave exposed annular lips of the two parts 22 which therefore are free to engage each other and thus seal the two halves of the joint.

The inner surface of each of the packings is spherical, but the packing parts 21 have round openings 26 of the same diameter as the internal diameter of the hollow shanks 12 and 13, and the packing parts 22 where they meet leave an opening of the same size as the openings 26.

The packing 21, 22 of housing 10 revolubly supports a generally spherical valve element 30, while that of housing 11 supports a similar valve element 31, these two elements being spaced apart a distance less than the diameter of one of them. Preferably, and as shown, the two elements are of the same diameter. They are provided with means for turning them about parallel axes which are disposed at right angles to the direction of flow of fluid through the joint. In the illustrated case the elements 30 and 31 have recesses 32 formed therein, and into each of these recesses there is driven a steel spleen 33 having a serrated perimeter to tightly engage the metal of the element, the latter being preferably aluminum, brass or some other material which is relatively non-corrosive and soft enough to readily receive the spleen. This spleen has a polygonal socket 34 to receive a correspondingly shaped key, and the packing 21, 22 as well as the housings 10 and 11 are perforated in alignment with the spleen 33 so that a key may be inserted and used to revolve the valve elements. Although not herein shown, suitable stop means may be provided for limiting the turning movement, preferably to an angle of 90°.

The valve elements 30 and 31 have passages 35 and 36 therethrough which are adapted to be aligned by revolution of the elements to the proper positions, these passages being preferably of the same diameter as the internal diameters of the hollow shanks 12 and 13, as shown in Fig. 3. One side of element 30 is provided with a recess 37 which has a surface conforming with the surface of revolution of element 31. The diameter of this recess is preferably at least as great as the diameter of the passages 35 and 36.

The formation of the valve elements as generally spherical and of the same size is preferred, but it should be understood that elements having surfaces of revolution other than spherical surfaces may be employed, and that the two elements need not be of the same size necessarily.

*Operation.*—Assuming that the two halves of the joint are separated and the valve elements are in closed position, and that it is desired to effect an open connection between the two conductors, the housings are then brought together with the beveled surfaces 15 and 16 mating with each other, after which the clamping collar 18 is rotated to engage the threads 17 and pull the housings together into locking engagement. The joint will then be in the condition illustrated in Fig. 5. The operator now inserts a key through the aperture in housing 11 into engagement with the socket 34, after which he turns the key to move the element 31 through the position illustrated in Fig. 6 to that illustrated in Fig. 7. This movement of element 31 is possible because of the fact that the recess 37 is in the proper position. Passage 36 is now in the operative or open position. Next, the operator withdraws his key from engagement with element 31 and inserts it into the socket of element 30, whereupon he turns the latter element through the position of Fig. 8 into that of Fig. 9. This latter movement is possible because the end of passage 36 provides the equivalent of a recess in element 31 through which the spherical surface of element 30 may travel, as clearly shown in Fig. 8. During these movements of the valve elements from closed to open position no outside air is permitted to enter the system.

The closing of the meeting ends of the conductors and the disconnection of the joint is effected by reversing the steps enumerated above. In other words the element 30 is moved from the Fig. 9 position through that of Fig. 8 to that of Fig. 7, after which the element 31 is turned from the Fig. 7 position through that of Fig. 6 to that of Fig. 5. The clamping collar 18 may then be unthreaded to back off the housings 10 and 11 from each other. In this case also no air is taken into either of the conductors and no liquid is lost.

In assembling one of the halves of the joint, that within the housing 10 for example, the packing part 21 is first inserted and caused to engage shoulder 23. Valve element 30 is then put in place, the operator being careful to cause spleen 33 to line up with the apertures through the housing and the part 21 of the packing. Next, the packing part 22 is inserted and its aperture caused to register with that in part 21, after which the ring 25 is threaded into place, thereby completing the mounting of the valve element and providing a tight seal around the latter as well as leaving an inner lip on part 22 free for engagement with the corresponding lip on the packing in the other part of the housing. The rings 25 are of course threaded in far enough so that they do not engage each other when the collar 18 is turned to cause tight engagement of the housings 10 and 11 with each other. Cylindrical valve elements rather than spherical ones could be employed, but at the present time I consider them less desirable for the reason that it would be more difficult to properly seal them.

In the foregoing description I have necessarily gone somewhat into detail in order to explain fully the particular embodiment of the invention herein illustrated, but I desire it to be understood that such detail disclosures are not to be construed as amounting to limitations, except as they may be included in the appended claims.

Having thus described my invention, I claim:

1. A detachable joint for fluid conductors, comprising a pair of mating housings, a valve element in each housing, said elements being revoluble about parallel axes perpendicular to the direction of flow through the joint, said elements having passages therethrough transverse to said axes and adapted to be aligned, and having surfaces of revolution about said axes, said axes being spaced apart a distance less than the diameter of one of said elements, one of said elements having a cavity in its side with a surface conforming to the surface of revolution of the other element, and a packing interposed between each element and its housing having an internal surface conforming with the surface of revolution of the element and having opposed openings matching the passages through said elements when aligned, the packing in one housing meeting and engaging the packing in the other housing when the housings are clamped together.

2. A detachable joint for fluid conductors, comprising a pair of mating housings, a valve element in each housing, said elements being revoluble about parallel axes perpendicular to the direction of flow through the joint, said elements having passages therethrough transverse to said axes and adapted to be aligned, and having surfaces of revolution about said axes, said axes being spaced apart a distance less than the diameter of one of said elements, one of said elements having a cavity in its side with a surface conforming to the surface of revolution of the other element, a packing interposed between each element and its housing, each of said packings having an internal surface conforming with the surface of revolution of the corresponding element and having opposed openings matching the passages through said elements when aligned, and each packing having a perforation therethrough in line with the axis of the corresponding element, through which operating means may project.

3. A detachable joint for fluid conductors, comprising a pair of mating housings, a generally spherical valve element in each housing, said elements being revoluble about parallel axes which are perpendicular to the direction of flow through the joint, said elements having passages therethrough at right angles to said axes and adapted to be aligned, said axes being spaced apart a distance less than the diameter of one of said elements, one of said elements having a cavity in its side conforming to the spherical surface of the other element, a packing in each housing having an inner surface conforming with the spherical surface of the valve element therein and having opposed openings matching the passages through said elements when aligned, the packing in one housing being adapted to meet and engage the packing in the other housing when the housings are mated, and means for clamping said housings together.

4. A detachable joint for fluid conductors, comprising a pair of mating housings, a generally spherical valve element in each housing, said elements being revoluble about parallel axes which are perpendicular to the direction of flow through the joint, said elements having passages therethrough at right angles to said axes and adapted to be aligned, said axes being spaced apart a distance less than the diameter of one of said elements, one of said elements having a cavity in its side conforming to the spherical surface of the other element, a two-part packing in each housing having an inner surface conforming with the spherical surface of the valve element therein, the line of division between said parts conforming with a plane through the axis of that element perpendicular to the said direction of flow, and removable means carried by each housing for engaging the outer part of the packing and holding the same in place while leaving a portion free to engage the packing in the other housing when the two housings are clamped together.

5. A detachable joint for fluid conductors, comprising a pair of mating housings, a generally spherical valve element in each housing, said elements being revoluble about parallel axes which are perpendicular to the direction of flow through the joint, said elements having passages therethrough at right angles to said axes and adapted to be aligned, said axes being spaced apart a distance less than the diameter of one of said elements, one of said elements having a cavity in its side conforming to the spherical surface of the other element, a two-part packing in each housing having an inner surface conforming with the spherical surface of the valve element therein, the line of division between said parts conforming with a plane through the axis of that element perpendicular to the said direction of flow, and a ring threaded into each housing having a surface shaped for engagement with the outer part of the packing to hold the same in position and in close engagement with the corresponding spherical valve element.

FRED E. HANSEN.

REFERENCES CITED

The following references are of record in the file of this patent:

UNITED STATES PATENTS

| Number | Name | Date |
|---|---|---|
| 1,330,429 | Campbell | Feb. 10, 1920 |
| 1,584,600 | Black | May 11, 1926 |
| 2,063,699 | Schellin | Dec. 8, 1936 |
| 2,340,119 | Graham | Jan. 25, 1944 |
| 2,357,232 | Snyder | Aug. 29, 1944 |
| 2,373,925 | Townhill | Apr. 17, 1945 |
| 2,376,803 | Mower | May 22, 1945 |
| 2,397,576 | Townhill | Apr. 2, 1946 |